United States Patent
Pearson et al.

(10) Patent No.: US 7,818,203 B1
(45) Date of Patent: Oct. 19, 2010

(54) METHOD FOR SCORING CUSTOMER LOYALTY AND SATISFACTION

(75) Inventors: James Owen Pearson, Holliston, MA (US); James E. Bampos, Middleton, MA (US); Ralph L. Specht, Jr., Westborough, MA (US); Wendy C. Robbins-Kane, Westborough, MA (US); Helen Rolfe Ham, Stow, MA (US); Peter T. Swaim, Wellesley, MA (US); Michael Dean Gale, Lunenburg, MA (US); Balasubramanian Krishnan, Needham, MA (US)

(73) Assignee: EMC Corporation, Hopkinton, MA (US)

( * ) Notice: Subject to any disclaimer, the term of this patent is extended or adjusted under 35 U.S.C. 154(b) by 533 days.

(21) Appl. No.: 11/478,090

(22) Filed: Jun. 29, 2006
(Under 37 CFR 1.47)

(51) Int. Cl.
*G06Q 30/00* (2006.01)
*G06Q 10/00* (2006.01)
*G06F 11/34* (2006.01)
*H04M 3/51* (2006.01)

(52) U.S. Cl. .......................................... 705/11; 705/1.1
(58) Field of Classification Search ................... 705/1
See application file for complete search history.

(56) References Cited

U.S. PATENT DOCUMENTS

| | | | |
|---|---|---|---|
| 6,507,851 B1 * | 1/2003 | Fujiwara et al. | 707/104.1 |
| 2005/0027683 A1 * | 2/2005 | Dill et al. | 707/2 |
| 2006/0161952 A1 * | 7/2006 | Herz et al. | 725/46 |
| 2006/0224437 A1 * | 10/2006 | Gupta et al. | 705/10 |

OTHER PUBLICATIONS

Johnson et al. The evolution and furture of national customer satisfaction index models. Journal of Economic Psychology 22 (2001) 217-245.*

* cited by examiner

*Primary Examiner*—John G. Weiss
*Assistant Examiner*—Candice D Carter
(74) *Attorney, Agent, or Firm*—Krishnendu Gupta; Robert Kevin Perkins

(57) ABSTRACT

A computer-based method and computer program product for determining customer satisfaction and loyalty.

10 Claims, 10 Drawing Sheets

Q3 2005 TCE SURVEY CAP PROFILE

| | Q305 IT CCSAT SURVEY | Q305 IT GEI SURVEY | Q305 IT PANEL SURVEY |
|---|---|---|---|
| NUMBER OF RESPONDENTS | 618 | 39 | 533 |
| NUMBER OF PARENT COMPANIES | 558 | 13 | 202 |
| NUMBER OF COUNTRIES | 64 | 34 | 67 |
| NUMBER OF MAJOR INDUSTRIES | 14 | 7 | 14 |
| | | | |
| 2005 FORTUNE 1000 REPRESENTATION | 13% | 46% | 27% |
| 2004 FORTUNE GLOBAL 500 REPRESENTATION | 23% | 85% | 24% |
| TOP 500 CUSTOMERS | 26% | 100% | 26% |
| TOP 1000 CUSTOMERS | 1% | 100% | 39% |
| RESELLERS | 1% | 0% | 5% |
| RESELLER AS DESIGNATED BY CUSTOMER ANALYSIS & PROFILING AT THE SHIP PARENT CUSTOMER LEVEL. INPUT INTO RESELLER WAS PROVIDED FROM VARIOUS GROUP WITHIN EMC AND IDENTIFYING RESELLER IS A CONTINUOUS PROCESS. | | | |

FIG. 8

METHOD FOR SCORING CUSTOMER LOYALTY AND SATISFACTION

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to a computer-based method and program product for collecting data related to customer satisfaction, and namely analyzing it, correlating it, and deriving a score related to the customer satisfaction and from which customer loyalty may also be assessed.

BACKGROUND OF THE INVENTION

As is known in the art, computer systems generally include a central processing unit (CPU), a memory subsystem, and a data storage subsystem. According to a network or enterprise model of the computer system, the data storage system associated with or in addition to a local computer system, may include a large number of independent storage devices or disks housed in a single enclosure or cabinet. This array of storage devices is typically connected to several computers over a network or via dedicated cabling. Such a model allows for the centralization of data that is to be shared among many users and also allows for a single point of maintenance for the storage functions associated with the many host processors.

Companies that sell data storage systems and the like are very concerned with protecting the customer's data and with the customer's satisfaction with the overall ownership experience because they would like to have a mutually satisfactory business relationship. It would be beneficial for such companies to have a way of being aware and being able to monitor a customer's satisfaction level, in order to better serve the customer, and to continue the mutually beneficial relationship. It would be an advancement to automate such a monitoring system for reliability, repeatability, and predictability.

SUMMARY OF THE INVENTION

The present invention in one embodiment is a computer-based method for a company to assess its customer satisfaction and loyalty to its products and services using computer-based steps. The method includes the steps of collecting data related to customer responses, analyzing the data related to the custom responses to determine correlations among responses; and using the correlations to derive a first score related to customer satisfaction and a second score related to customer loyalty to company's products and services. In another embodiment, a program product is enabled for carrying out method steps like those in the method embodiment of this invention.

BRIEF DESCRIPTION OF THE DRAWINGS

The above and further advantages of the present invention may be better under stood by referring to the following description taken into conjunction with the accompanying drawings in which:

FIG. 8 is an example of customer analysis and profiling using collected data to improve and maintain customer satisfaction using the program logic;

DETAILED DESCRIPTION OF THE PREFERRED EMBODIMENT

The invention includes embodiments that are computer-based methods and program product for collecting data related to customer satisfaction, and namely analyzing it, correlating it, and deriving a score related to the customer satisfaction and from which customer loyalty may also be assessed.

The methods and apparatus of this invention may take the form, at least partially, of program code (i.e., instructions) embodied in tangible media, such as floppy diskettes, are the CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. When the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 1:
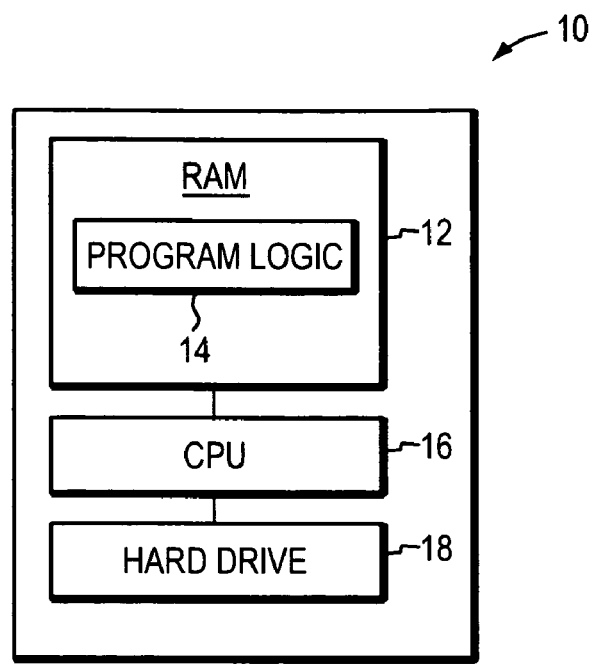
FIG. 1 is a block diagram of a computer system with program logic for a customer experience assessment system embodiment of this invention.
Figure 2:
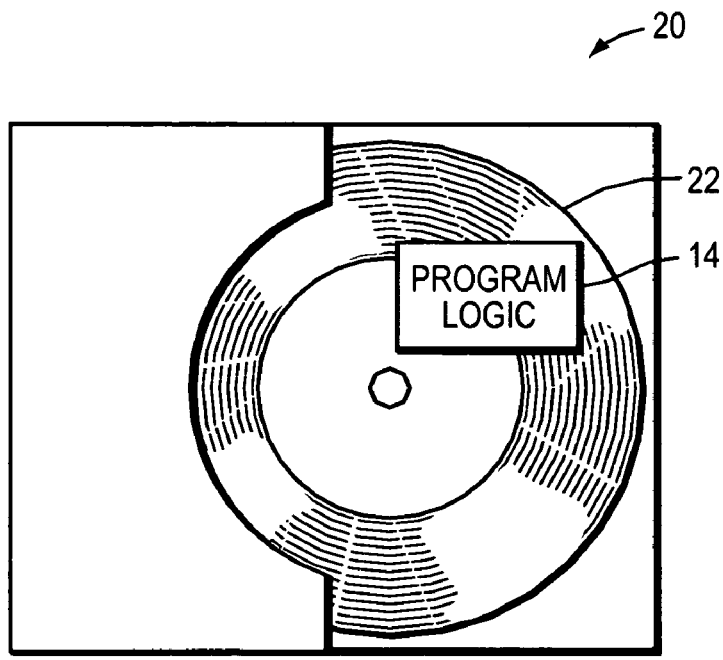
FIG. 2 is a computer data storage medium encoded with the program logic of FIG. 1 for carrying out methodology described herein.

Reference is made below to FIGS. 1 and 2. Referring to FIG. 1, when the program logic 14 is executed by CPU 16 and memory 12 combinations in a general purpose digital computer 10 the logic and computer 10 become a special purpose apparatus for carrying out methodology described herein. Referring to FIG. 2, another embodiment of the invention is shown wherein Program Product 20 includes a computer-readable medium 22 having the program logic 14 encoded thereon. When executed in a computer's memory by a processing unit, the logic reconfigures a general purpose digital computer into a special purpose digital computer enabled for carrying out the process and methodology discussed herein.

Figure 3:
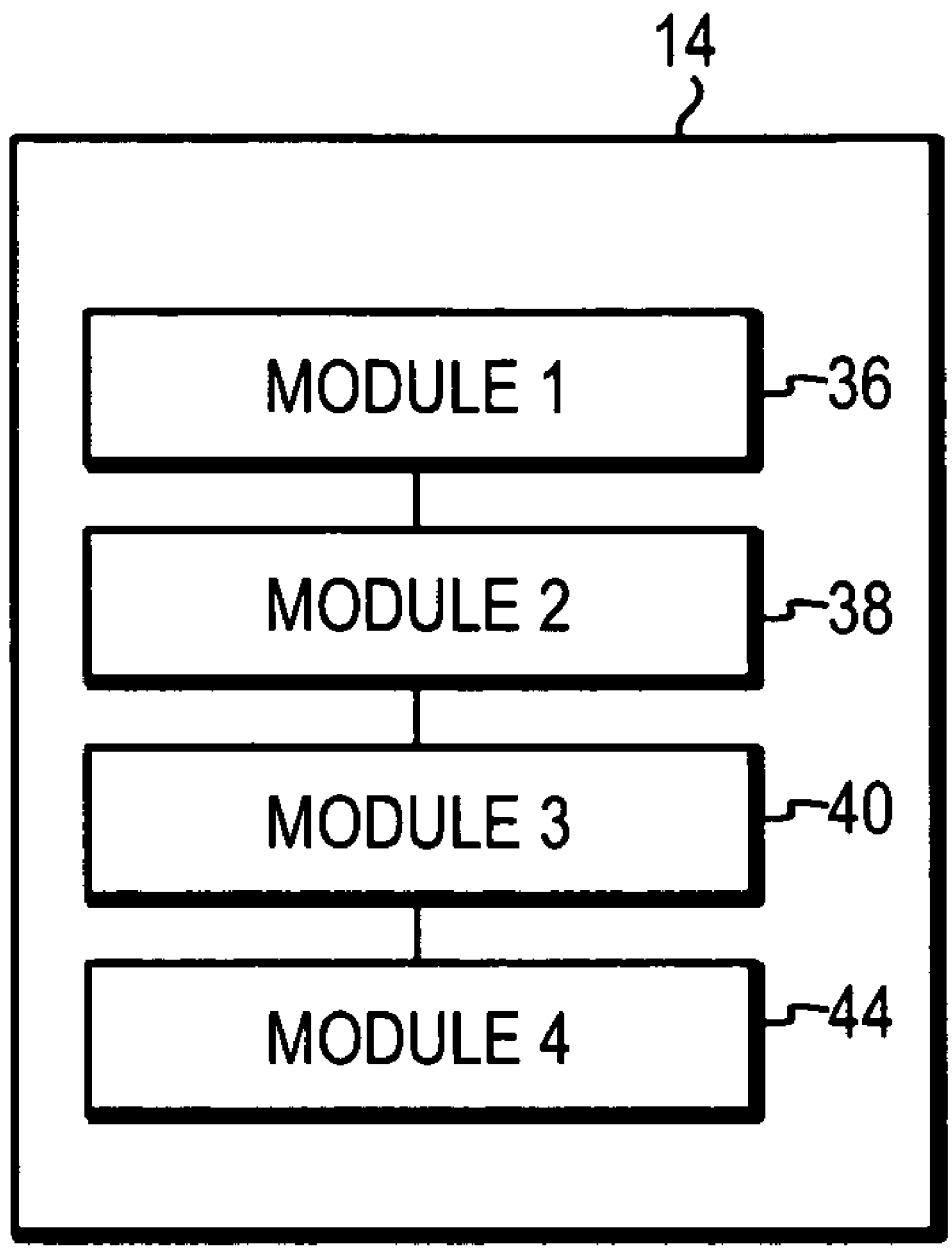
FIG. 3: A functional block diagram of components of the program logic.

Referring to FIG. 3, Program Logic 14 includes Modules 36-42, labeled as Modules 1-4, wherein Module 1 is a data collection module, Module 2 is a data analyzing and calculations module; Module 3 is a data analysis and correlation, Module 4 is a presentation module. Although shown as one coherent configuration for simplicity, Program Logic 14 may span one or more computers and computer memories, but are shown as such for simplicity. One skilled in the art will recognize that the modules may be separated or combined in any fashion, and including in various computers without deviating from the claimed invention.

Figure 4:
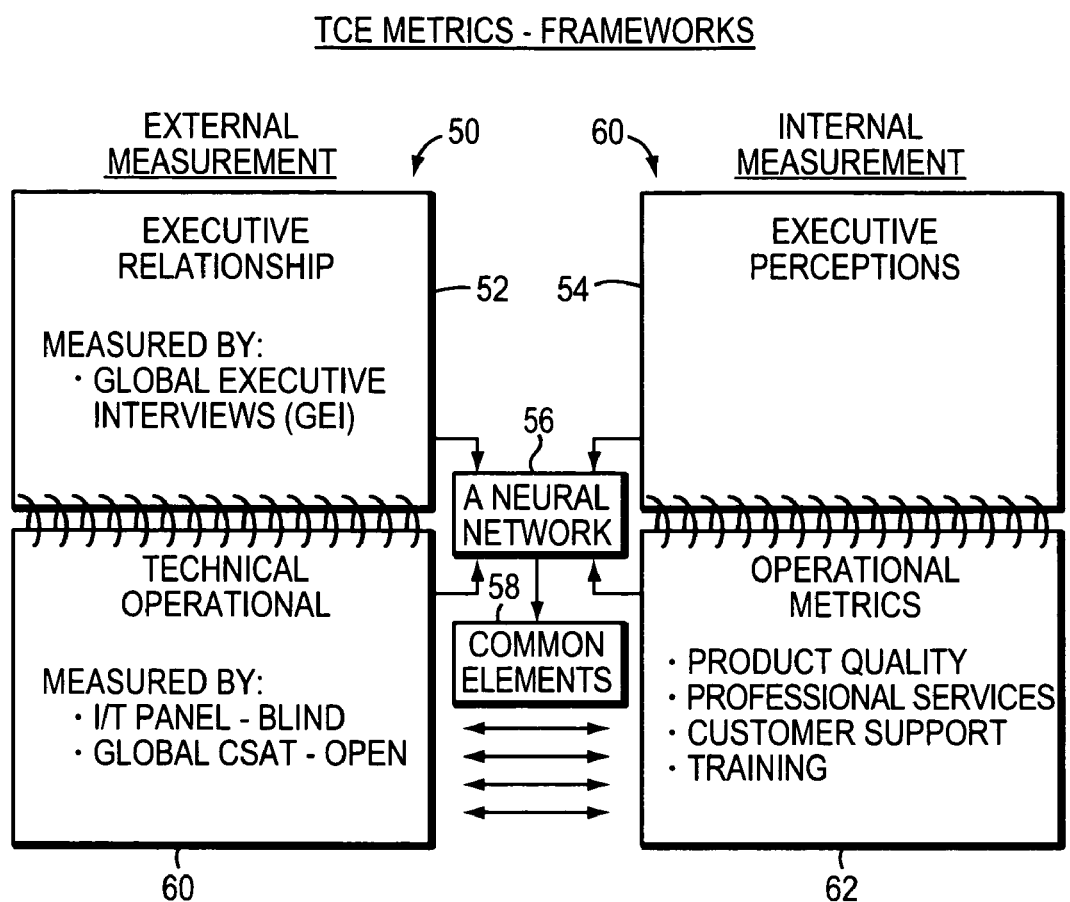
FIG. 4 is an overview schematic of scoring metrics for data related to customer satisfaction acted upon by the program logic and including steps of gathering such data, analyzing it, correlation of it, and presentation of results obtained from such steps.

Referring to FIG. 4, so-called TCE Metrics is an effort that provides a framework for accurate measurement of the Company's Total Customer Experience to drive the Company's behavior and improve TCE. The effort involves the creation of a Company scorecard, by the Program Logic, that includes a single number or "TCE Number", which has transparency, integrity and enables accountability with the following attributes:

Fact-based, sustainable, repeatable, measurement(s)
Measurement(s) that can evolve with the needs of the business
Measurement(s) that drives proper Company behavior to improve quality
Improved TCE (relationship and product usage)
Improved Company products and services (all)
Measurement(s) that ensures the involvement of all the Company's employees in the TCE program In addition, the effort uses the Program Logic to measure internal operational metrics and provides a mechanism to correlate the external scorecard to internal operational metrics and drivers to improve TCE. The TCE Metrics Framework has External Measurements 50 and Internal Measurements 60 described below. The TCE external measurements are customer facing and the TCE internal measurements are Company internal measurements.

Three external surveys constitute the TCE score for the corporation, also called the Customer Loyalty Index (CLI). The three surveys are the Global Executive Interviews (GEI) part of the Executive Relationship 52, the IT-Panel survey (IT-Panel) and the Global Customer Satisfaction survey (GC-SAT) are part of the Technical operation 60.

The TCE internal measurements are operational metrics that describe Operational Metrics 62 that include Product Quality, Professional Services, Customer Support, and Training. Executive Perceptions 54 is also measured. The Executive Perceptions are internal relationship measurements of the Executive relationships. Multiple sets of metrics describe each of these categories and a TCE internal score created to describe the operational metrics.

The framework also includes the application of Neural Networks 56 that are part of the Program Logic as well as correlation and regression analyses, also part of the Program Logic, that identify drivers of TCE. Thus Common Elements 58 are determined among the relationships, perceptions, and operations.

The external measurements aim to measure two key elements of TCE: the Executive Relationship that is responsible for buying decisions and the Technical Operational measurements that influences the Executive relationship and contributes to TCE. Global Executive Interviews (GEI) measures the Executive Relationship. The I/T Panel TCE Survey and the Global Customer Satisfaction Survey measure the Technical Operational performance.

A representative sample of worldwide accounts is used for our measurements of TCE. A Customer Analysis & Profiling (CAP) effort enables the selection of the right mix of customers to be surveyed each quarter. The details of the customer profiles are as follows for the three different surveys. Survey Respondents contributed between 39% and 42% of Company's Revenue for the trailing six quarters.

The following summary details the Company customer profile association by survey includes Customer Companies at the parent level:

The GEI (Global Executive Interviews) survey interviews Business Executives,
The IT Panel survey interviews Information Management Executives;
The Global CSAT survey asks survey questions to measure satisfaction The GEI and Global CSAT are relationship surveys. Relationship surveys are designed to measure key aspects of customer relationships and have two key characteristics:

They are conducted "Open", where the sponsor Company is identified and the customer name is known
They are designed with a "closed-loop" process that allows the Company management/employees to respond directly to any customer issues raised through the survey process.

The IT-Panel TCE Survey is a double blind survey, which provides the highest level of objectivity. It also allows objective gathering of competitive information. Blind surveys are conducted to minimize subjective biases. They are conducted so that the respondent does not know who the sponsor is. Double blind surveys are conducted so that the sponsor company also does not know who the survey respondent is. Demographics are used to segment and analyze the results.

Quantitative surveys are designed with statistically valid sample sizes that allow for the information to be analyzed in aggregate. Most questions are multiple choices. Usually, the numbers of open ended questions (for individual comments) are limited, due to the difficulty of aggregating the results. Quantitative surveys do not offer the opportunity to ask follow on questions or dig deeper into the responses during the survey implementation. The Global CSAT, IT-Panel TCE, and GEI surveys are all quantitative surveys.

Qualitative surveys are designed to gather the kind of information gotten from a discussion. Forms of qualitative research include focus groups and in-depth interviews. A discussion guide is developed and followed. However, qualitative studies allow additional, unplanned questions based on the specific customer responses. The GET survey has qualitative elements to it to assist with problem resolution.

All of the above surveys are part of the data collection process, and the Program Logic may be used to automate much of the collection and gathering.

The Program Logic also uses Statistical driver analysis techniques to better understand the impact of attributes (measured in survey questionnaires) on a particular factor, such as the Overall Satisfaction or Willingness to Recommend. Driver analysis techniques include Correlation Analysis, Regression Analysis and non-linear statistical techniques such as Neural Networks and Genetic Algorithm Analysis. These are applied to the TCE External Metric Survey data.

The Company Customer Loyalty Index (CLI) measures three elements: customer satisfaction, repurchase intent and willingness to recommend Company. Customer Loyalty is composed of both perceptions and behavior. Current research shows that Customer Loyalty is directly tied to the Company revenue. According to certain research, it is estimated that a 10% increase in Customer Loyalty will increase revenue by 12.5%.

In order to measure both perception and behavior, the Customer Loyalty Index (CLI) is developed based on questions surveying three attributes: overall Satisfaction (perception); repurchase Intent (behavior); and willingness to recommend (behavior). The CLI is the percent of responses where all three questions receive a positive score. To understand the dynamics of customer loyalty over time, one may also measure the percent of responses that receive a 'negative' score as well as those that receive a neutral score.

Figure 5:
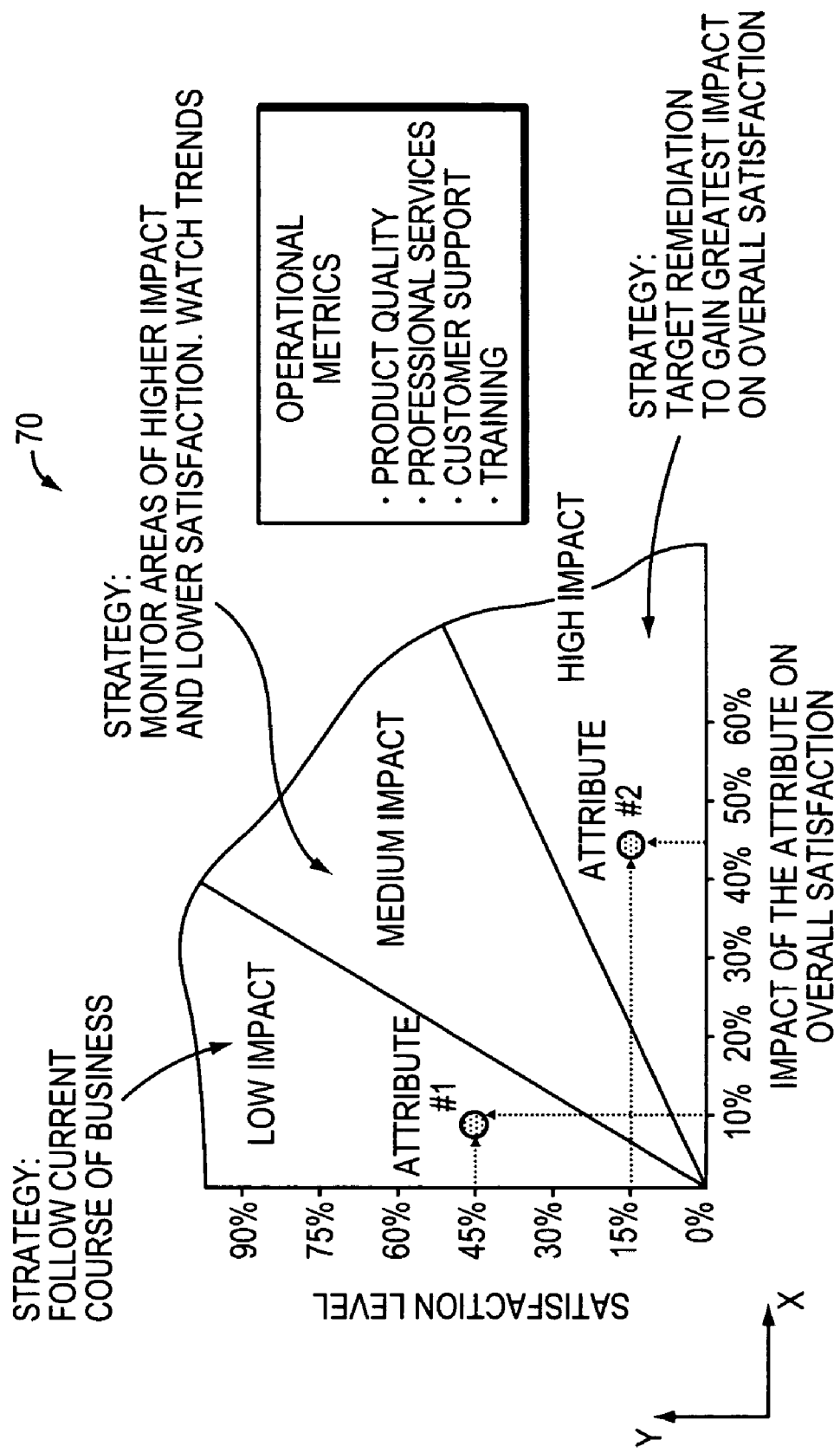
FIG. 5 is a graph representing customer satisfaction level obtained with the scoring metrics and the program logic.

Referring to FIG. 5, neural networks are used by the Program Logic to analyze the survey responses to determine areas of opportunity with maximum impact on Attributes that contribute to the Customer Loyalty Index. Graph 70 shows Satisfaction Level (Y) graphed against Impact of the Attribute on Overall Satisfaction (X), and focus in the example is on three determined Attributes. The Operational Metrics involved are Product Quality, Professional Services, and Customer Support Training. Attribute #1 is determined to be Low Impact, and the recommended strategy is to follow the current course of business. Attribute #2 is determined to be Medium Impact, and the recommended strategy is to monitor areas if higher impact and lower satisfaction, and to watch trends. Attribute #3 is determined to be High Impact, and the recommended strategy is to target remediation to gain the greatest impact on overall satisfaction.

Figure 6:
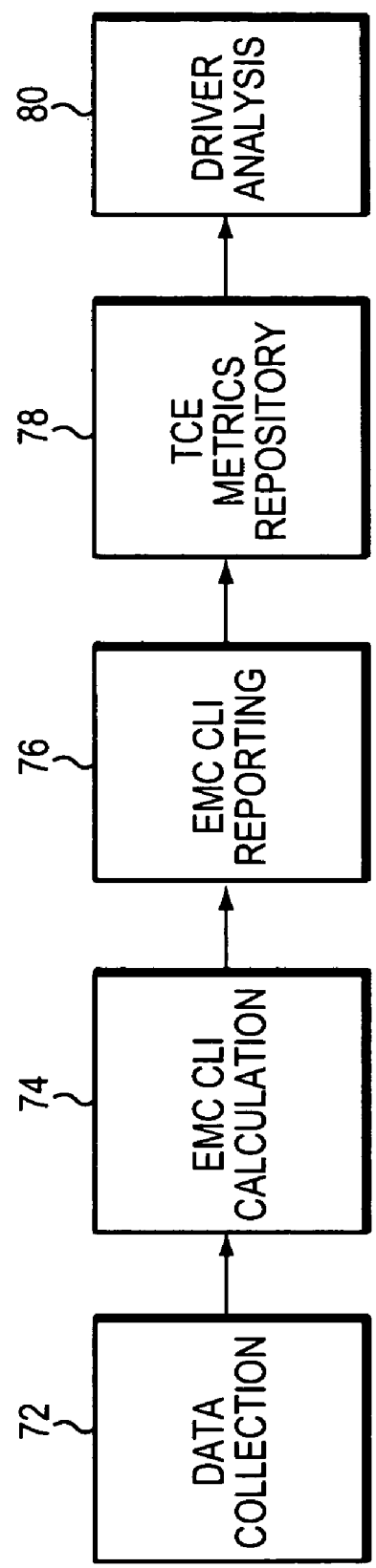
FIG. 6 is a logical flow diagram for using TCE metrics for deriving a Customer Loyalty Index (CLI) using the program logic.

Referring to FIG. 6, a high-level process map for the calculation of the Customer Loyalty Index is shown. Data Collection in step 72 is used for CLI Calculation in Step 74, CLI Reporting Step 76, and this information is placed in a TCE Metrics Repository 78, on which the Driver Analysis is applied. The Program Logic, in whole or part, may perform the above steps.

The Data Collection can be from the above-discussed surveys, and may be provided in a well-known format such as Microsoft-Excel spreadsheet, or may be machine-readable only. The Customer Loyalty Index (CLI) is calculated from a combination of the three surveys. A Customer Loyalty Index is independently calculated for each of the three surveys.

An example of a way of calculating such is given below in Equation 1 (Eq. 1):

$CLI_{GEI}$ (Q) is defined as the percentage of "positive" responses to the GEI survey in the quarter Q.
$CLI_{IT\text{-}Panel}$ (Q) is defined as the percentage of "positive" responses to the IT-Panel survey in the quarter Q.
$CLI_{GCSAT}$ (Q) is defined as the percentage of "positive" responses to the Global CSAT survey in the quarter Q.

$$CLI(Q)=0.5*CLI_{GEI}(Q)+0.25*CLI_{IT\text{-}Panel}(Q)+0.25*CLI_{GCSAT}(Q) \quad (Eq. 1)$$

For analysis and trending purposes, a "negative" Customer Loyalty Index and a "neutral" Customer Loyalty Index are defined. A formula similar to the Customer Loyalty Index is used to develop the "negative" CLI and "neutral" CLI formed from percentages of "negative" and "neutral" responses to the three different surveys respectively. The CLI is reported quarterly to an appropriate internal business executive so that the Company may appropriately react.

In general, the CLI calculation, created from a customer satisfaction score, which itself may rely on one or more scores allows Company to assess its customer satisfaction and loyalty to its products and services using computer-based steps. The method includes collecting data related to customer responses, analyzing the data related to the customer responses to determine correlations among responses, and using the correlations to derive a first score related to customer satisfaction and deriving a second score from the first score that is related to customer loyalty to company's products and services.

All data necessary to complete External and Internal operational metrics is loaded and maintained in the TCE Metrics Repository or Database. The TCE Metric Operational and external CLI scores will be processed by using information loaded into the TCE metric database. This information is up-loaded from source systems either weekly or monthly depending on business requirements. This information is stored by business metric and is in a number of Oracle-based tables. The Program Logic using a TCE metric Web tool to display and format the information in report, tabular and graph forms accesses these tables.

A combination of techniques may be used to by the Program Logic to analyze the survey data including Neural Networks, Trend Analyses as well as regression analyses. Neural networks and drivers are used to identify areas of opportunity for CLI improvement.

Figure 7:
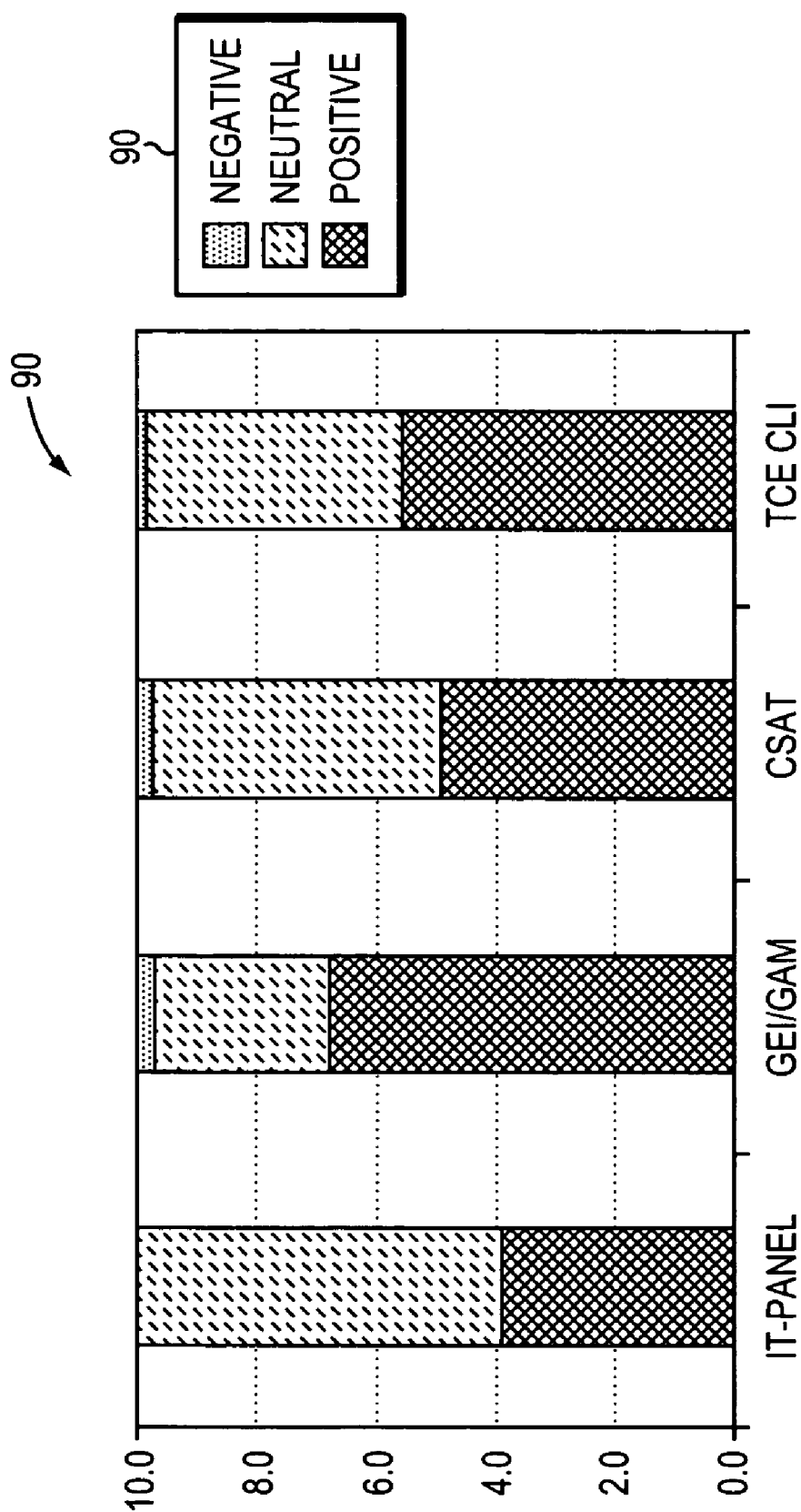
FIG. 7 is a graphical representation of CLI results obtained using the program logic.

Referring to FIG. 7, an overview chart 90 presents a Survey Summary for GEI and Global CSAT, IT-PANEL, and the TCE CLI. It is an example of how the Program Logic can be used to gain quick insight into trends and developments. Here the IT-Panel is more neutral than positive, but shows no negative. The GEI shows more positive, but includes some negative. While the CSAT shows a close to 50% positive, but some negative also. The overall CLI is similar to the CSAT. The Company executives may quickly discern that some change is needed in order to reduce the negative responses, and increase the CLI.

Referring to FIG. 8, an example of Customer profiles for each survey type—IT Panel, GEI, and Global CSAT—are summarized and presented in the following table 96, and which may be presented by the Program Logic for assessment purposes by the Company executives. The number of respondents, parent companies, countries, and industries, for each survey gives a snapshot of the survey audience. The representation of FORTUNE 1000 and 500 respondents is also yields meaningful insights, as does the ranking within the Company (top 500 and 1000 customers). Resellers are also included in the survey and their representation is noted in the table.

Figure 9:
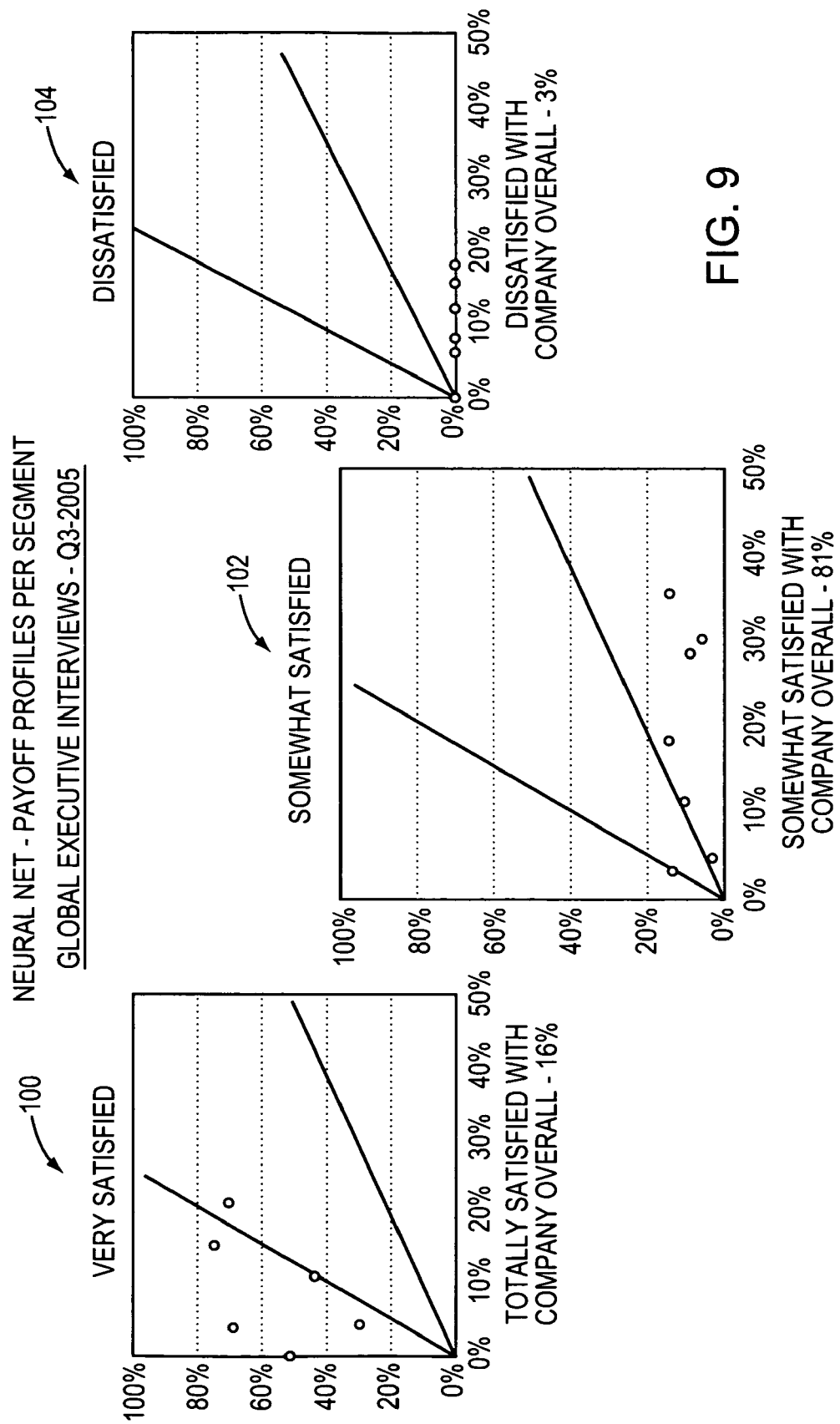
FIG. 9 is a representation of profiles indicating customer satisfaction by segment of satisfaction levels obtained using the program logic.

Referring to FIG. 9, the neural network of the Program Logic can present payoff profiles per segment based on survey or interviews. Here the GEI from a certain quarter (Q3-2005) shows that Segment Graph 100 indicates that 16 Percent are totally satisfied with the Company overall, and the data points show the particular items they are satisfied with, such as Company's hardware, support services, or software. The GEI also shows that Segment Graph 102 indicates that 81 Percent are somewhat satisfied with the Company overall, and the data points show the particular items they placed at a lower ranking than that shown in graph 100. Finally, Segment Graph 104 shows that 3% are dissatisfied with the Company overall, and data points show a low ranking of satisfaction.

Figure 10:
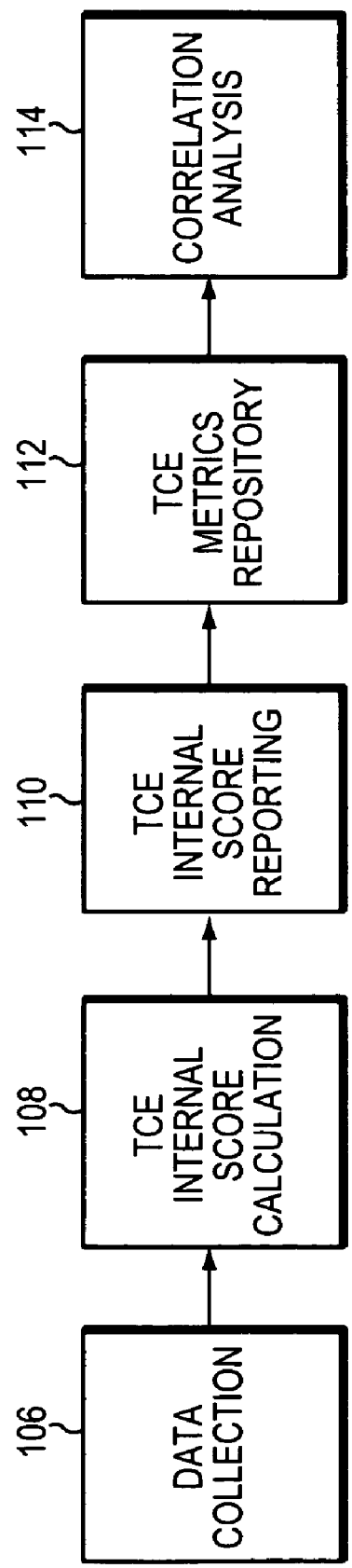
FIG. 10 is a flow diagram showing how a TCE metrics score is created internally using the program logic.

Referring to FIG. 10, a high-level process map for the calculation of TCE Internal and its use is shown. Data Collection in step 106 is used for TCE Internal Score Calculation and Reporting in Steps 108-110, respectively, and this information is placed in a TCE Metrics Repository in step 112, on which the Correlation Analysis step 114 is performed. The Program Logic, in whole or part, may perform the above steps. The Data Collection, Repository and Correlation is similar to that discussed above, so focus below is on TCE Internal Score Calculation and Reporting.

The TCE internal score is calculated for all the Company products possessed by a given customer. A break down of the major products is performed to provide the Company with an indication of the customer's perception of the major products. The TCE internal score is computed from an algorithm composed of metrics that track the Company's operational performance continually at customer sites. The TCE internal score template is made up of sections that are tracked on a monthly basis by customer. All of these components contribute to the TCE internal score that can be used as a measure of customer temperature. The TCE internal score is typically a lagging indicator of the Company's operational performance—i.e., the score reflects the actual performance of the Company's products, solutions and services at a customer site. Customers who get additional training with the Company's products result in additive scores. Customers who indicate a willingness to recommend the Company's products also result in additive scores Data Loss and Data Unavailable components lead to a negative perception of the Company and therefore contribute as a subtractive component. Problem severity lead to a negative perception as well and contribute as a subtractive component. Calls escalated to engineering are used an internal perception of quality and contributes as a subtractive component. A longer length of time spent resolving a customer issue (Turn Around Time or TAT) or case leads to a negative perception as well and contributes as a subtractive component. A longer length of time spent for initial response (Initial Response Time) leads to a negative perception as well and contributes as a subtractive component. The number of times that we do not resolve the problem on the first attempt leads to a negative perception. The rationale behind subtractive components is the assumption that the customer is initially satisfied with the Company products, and therefore negative incidents are subtracted from a baseline score.

An overall raw TCE score is calculated by subtracting the negatives and adding the additives to a baseline score, in its most simplified form, and the TCE Internal Score applies a weighting scale to the actual additives and negatives and factors in details of events, such as problem severity to arrive at the TCE internal score.

A common TCE data repository is used to collect and manage all TCE operational metrics. Most of the data will be collected at the lowest detail level from transactional applications when possible. The repository data feeds are performed weekly. All reporting is done through the use of a web user interface. Reports and graphs are generated and displayed, and printing and extracting to excel is provided. The Program Logic is employed to perform any of the above steps.

Figure 11:
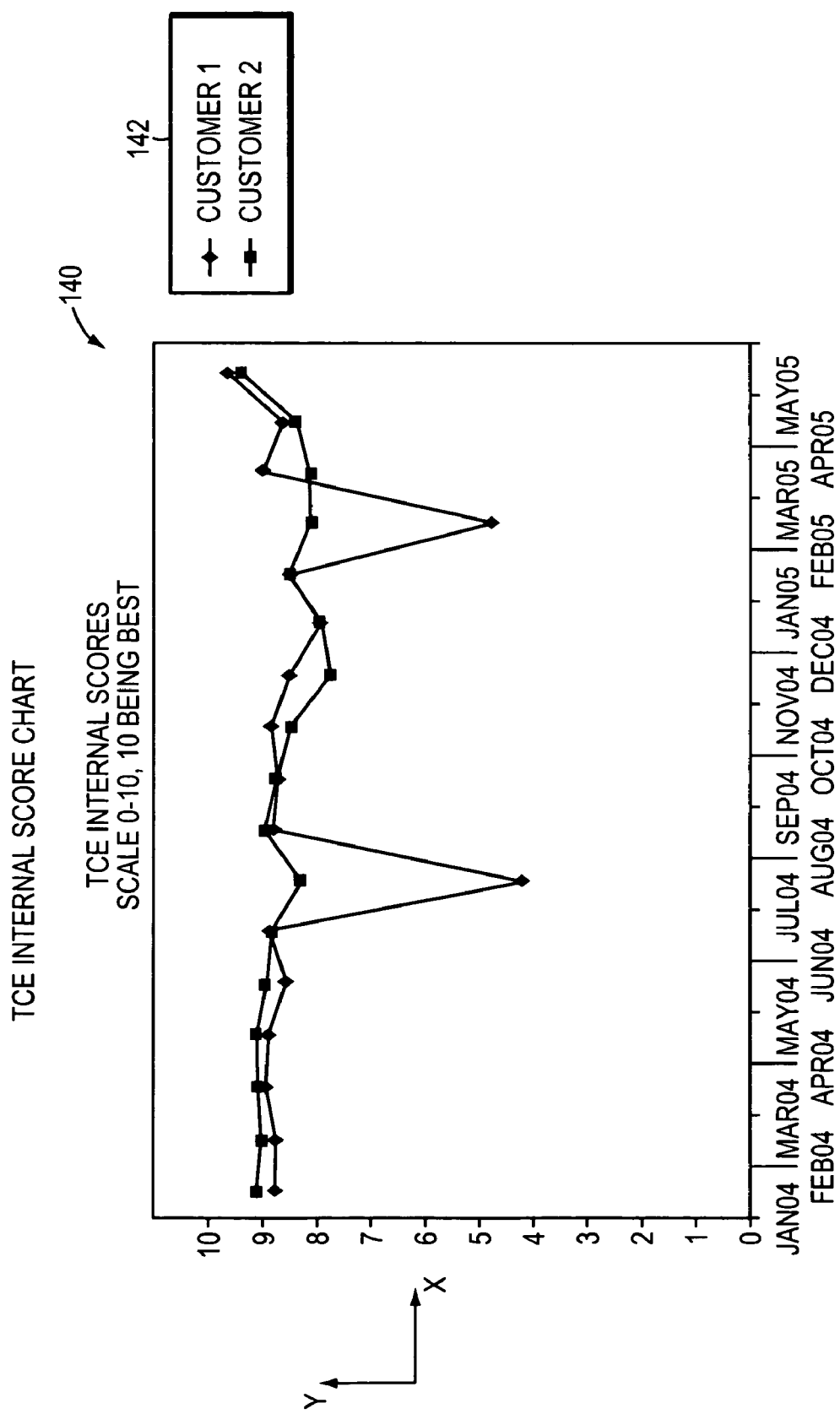
FIG. 11 is a graphical view for analysis of customer TCE metrics score trended over time.

Referring to FIG. 11, the Program Logic can present a TCE Internal Score Chart 140 comparing the TCE internal for customers, such as Customer 1 and 2 (see Key box 142). On a Scale of 0-10, wherein 10 is the best TCE internal Score presented as Y against months on the X axis. Since, the TCE Internal Score is useful as a feedback for initiatives implemented by different organizations, and assists in detecting negatives that would affect TCE, here it can be seen that probably there is a problem with Customer 2 and something better is going on with Customer 1. A further study and analysis may provide very useful information to the Company, and may also benefit each customer.

A computer-based method and program product for collecting data related to customer satisfaction, including analyzing it, correlating it, and deriving a score related to the customer satisfaction and from which customer loyalty may also be assessed has been described. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A method for a company to assess its customer satisfaction and loyalty to its products and services using a special purpose digital computer including memory and a computer processor, the method comprising the computer-executed steps of:
   collecting in the computer memory data related to a customer responses about the company and the company's products that the customer is using;
   analyzing with the computer processor the data related to the customer responses to determine with a neural network correlations among responses denoting the impact of each portion of the data on a total customer experience, impact on overall satisfaction, and satisfaction level;
   using the computer processor to process the correlations among responses to statistically derive first values representative of customer satisfaction and loyalty, wherein the correlations are used by the neural network to (i) determine impact on attributes of customer loyalty and (ii) to identify areas of opportunity for customer satisfaction and loyalty improvement;
   further collecting in the computer memory data related to the performance of the company's products that the customer is using; and
   using the computer processor to statistically derive second values representative of the performance of the company's products that the customer is using, and using these statistically derived second values to further derive values representative of customer satisfaction and loyalty that are used in combination with the derived first values to derive a third value that represents the total customer experience with the company and the products that the customer is using.

2. The method of claim 1, wherein the analysis performed with the computer processor includes regression analysis.

3. The method of claim 1, wherein the analysis performed with the computer processor includes trends analysis to identify trends in the data.

4. The method of claim 1, wherein the data is collected with the computer memory using survey data from a plurality of sources.

5. The method of claim 1, wherein the data related to customer responses is combined with data related to service and maintenance performance of customer's products from the company, and the combined data is analyzed and correlations are determined based on the analysis of the combined data.

6. A computer program product for a company to assess its customer satisfaction and loyalty to its products and services using computer-based steps, the program product encoded with program logic for enabling the computer execution of:
   collecting in the computer memory data related to a customer responses about the company and the company's products that the customer is using;
   analyzing with the computer processor the data related to the customer responses to determine with a neural network correlations among responses denoting the impact of each portion of the data on a total customer experience, impact on overall satisfaction, and satisfaction level;
   using the computer processor to process the correlations among responses to statistically derive first values representative of customer satisfaction and loyalty, wherein the correlations are used by the neural network to (i) determine impact on attributes of customer loyalty and (ii) to identify areas of opportunity for customer satisfaction and loyalty improvement;

further collecting in the computer memory data related to the performance of the company's products that the customer is using; and using the computer processor to statistically derive second values representative of the performance of the company's products that the customer is using, and using these statistically derived second values to further derive values representative of customer satisfaction and loyalty that are used in combination with the derived first values to derive a third value that represents the total customer experience with the company and the products that the customer is using.

7. The computer program product of claim 6, wherein the analysis includes regression analysis.

8. The computer program product of claim 6, wherein the analysis includes trends analysis to identify trends in the data.

9. The computer program product of claim 6, wherein the data is collected using survey data from a plurality of sources.

10. The computer program product of claim 6, wherein the data related to customer responses is combined with data related to service and maintenance performance of customer's products from the company, the combined data is analyzed and correlations are determined based on the analysis of the combined data.

* * * * *